(12) United States Patent
Lavon

(10) Patent No.: US 11,245,619 B1
(45) Date of Patent: Feb. 8, 2022

(54) DYNAMIC FABRIC SYSTEM

(71) Applicant: ECI Telecom Ltd., Petah Tikva (IL)

(72) Inventor: Aharon Lavon, Modiin (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 17/111,263

(22) Filed: Dec. 3, 2020

(51) Int. Cl.
*H04L 12/721* (2013.01)
*H04L 12/46* (2006.01)
*H04L 12/753* (2013.01)
*H04L 12/24* (2006.01)
*H04L 12/761* (2013.01)

(52) U.S. Cl.
CPC .......... *H04L 45/38* (2013.01); *H04L 12/4633* (2013.01); *H04L 12/4675* (2013.01); *H04L 41/12* (2013.01); *H04L 45/16* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 6,600,741 B1* | 7/2003 | Chrin | H04L 12/64 370/375 |
| 9,270,599 B1 | 2/2016 | Nagarajan et al. | |
| 2003/0231624 A1 | 12/2003 | Alappat et al. | |
| 2006/0034302 A1 | 2/2006 | Peterson | |
| 2006/0092968 A1* | 5/2006 | Brolin | H04J 3/0688 370/465 |
| 2012/0128004 A1 | 5/2012 | Aybay et al. | |
| 2012/0297103 A1 | 11/2012 | Kamble et al. | |
| 2019/0222436 A1* | 7/2019 | Xu | H04Q 11/0062 |
| 2020/0059712 A1* | 2/2020 | Satyarthi | H04J 14/0212 |

OTHER PUBLICATIONS

International Search Report and Written Opinion of the International Searching Authority received in International Application No. PCT/IB2021/000142, dated Jul. 8, 2021 (12 pgs.).

* cited by examiner

*Primary Examiner* — Chi H Pham
*Assistant Examiner* — Raul Rivas
(74) *Attorney, Agent, or Firm* — Finnegan Henderson, Farabow, Garrett & Dunner, LLP

(57) ABSTRACT

Dynamic fabric systems and methods are disclosed for providing connections between endpoints of a communication network. An exemplary dynamic fabric system can include backplane lanes, a dynamic fabric device, and a control device. The dynamic fabric device can include local fabric lanes and a network interface device configurable to communicatively connect the local fabric lanes to a network. The dynamic fabric device can also include a local switch configurable forward messages to backplane lanes and an interconnect configurable to statically connect local fabric lanes and corresponding backplane lanes. The dynamic fabric device can also include a controller configurable to create or break these static connections. The control device can provide instructions to the dynamic fabric device to create or break the static connections based on changes in the number of active dynamic fabric devices installed in the dynamic fabric system.

20 Claims, 7 Drawing Sheets

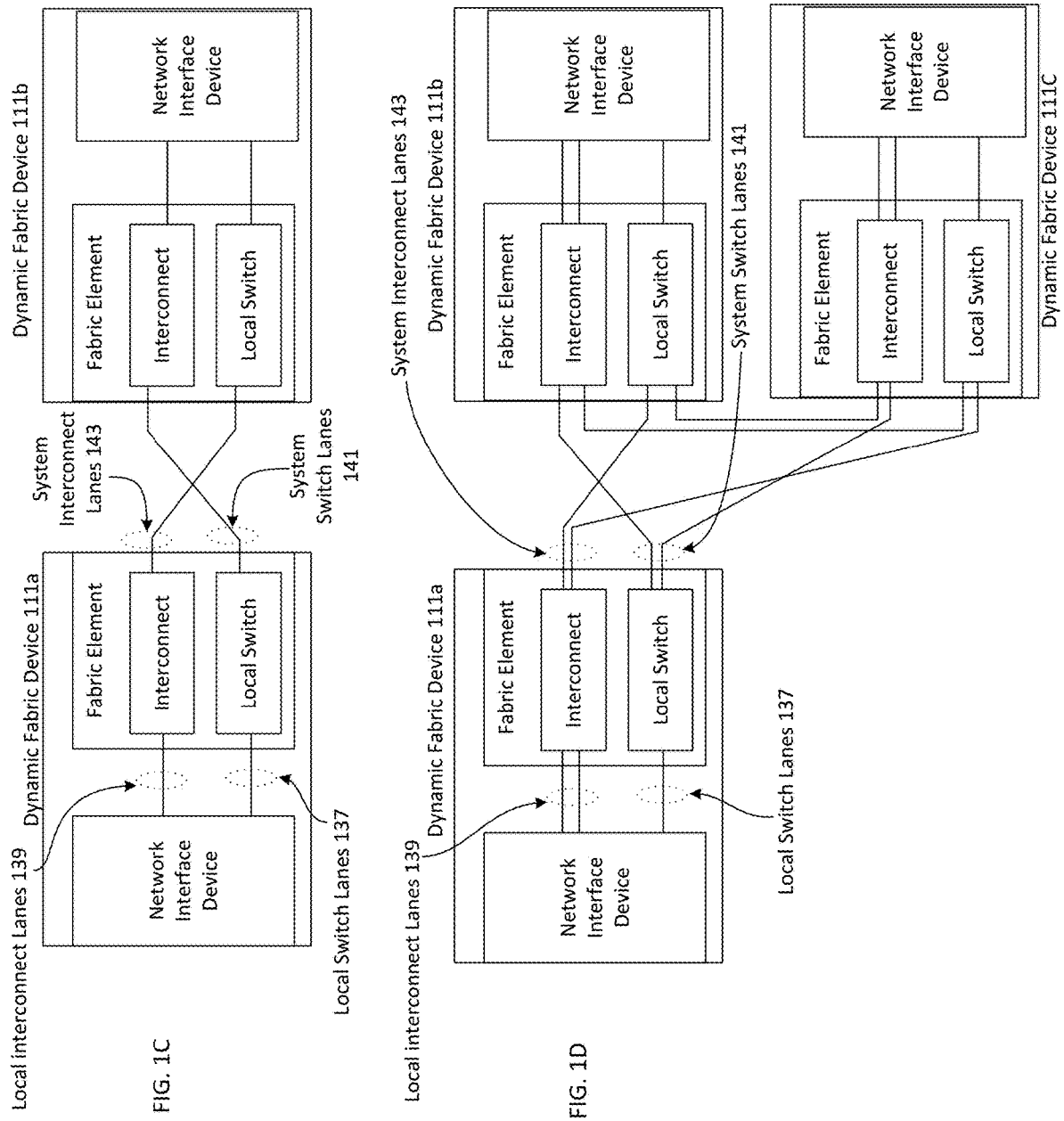

DYNAMIC FABRIC SYSTEM

BACKGROUND

A communication network provides connections between endpoints of the communication network. These connections can be managed (e.g., made or broken) consistent with the requirements of users of the communication network. A Clos network architecture offers a particular way to manage connections between network endpoints. Such an architecture can include two types of devices: I/O devices and switching devices. Communications can enter and leave the network through an I/O device. Connections between I/O devices can be managed by switching devices. The I/O and switching devices can be arranged in three stages: an ingress stage, a switch stage, and an egress stage. The ingress and egress stages can each include I/O devices, while the switch stage can include switch devices. The ingress stage can include r I/O devices, each having n inputs and m outputs. The switch stage can include m switch devices that each accept r inputs and provide r outputs. The egress stage can include r I/O devices, each having m inputs and having n outputs. Thus, the overall architecture maps n inputs to n outputs using 2r I/O devices and m switch devices. Each switch device in the switch stage can be configured to connect any output of any I/O devices in the ingress stage to any input of any I/O device in the egress stage.

SUMMARY

The disclosed systems and methods can support a dynamically reconfigurable network architecture. Consistent with disclosed embodiments, fabric elements can be added together with network interface devices, allowing service providers to scale network capacity and complexity together with network demand.

The disclosed embodiments include a dynamic fabric device. The dynamic fabric device can include local fabric lanes, a network interface device, and a fabric element. The network interface device can be configurable to communicatively connect the local fabric lanes to a network. The fabric element can be configurable to communicatively connect the local fabric lanes to a backplane including backplane lanes. The fabric element can include a local switch and an interconnect. The local switch can be configurable to receive messages from any of a first group of the local fabric lanes for forwarding to any of a first group of the backplane lanes. The interconnect can be configurable to statically connect each of a second group of the local fabric lanes to a corresponding one of a second group of the backplane lanes. A first number of lanes in the first group of the backplane lanes can equal a second number of lanes in the second group of the local fabric lanes.

In some embodiments, the dynamic fabric device can also include a controller. The controller can be configurable to reconfigure the fabric element. The fabric element can be reconfigured to remove lanes from the first group of the local fabric lanes and add lanes to the second group of the backplane lanes in response an indication of an installation or activation of another dynamic fabric device. The fabric element can also be reconfigured to add lanes to the first group of the local fabric lanes and remove lanes from the second group of the backplane lanes in response an indication of a failure or removal of the other dynamic fabric device.

In some embodiments, removing the lanes from the first group of the local fabric lanes can include reconfiguring a first local fabric lane to form a static connection with a first backplane lane. Each static connection comprises a re-timer. In some embodiments, the network interface device can include at least one of: a fabric interface, a traffic manager, or a packet processor. The fabric element can be a cell-based self-routing fabric element. In some embodiments, each of the local fabric lanes can include a serial transmission link and a serial reception link.

The disclosed embodiments also include a dynamic fabric system. The dynamic fabric system can include a backplane, at least two dynamic fabric devices, and at least one control device. The backplane can include backplane lanes. The at least two dynamic fabric devices can include a first dynamic fabric device. The first dynamic fabric device can include local fabric lanes, a network interface device, a local switch, an interconnect, and a controller. The network interface device can be configurable to communicatively connect the local fabric lanes to a network. The local switch can be configurable to receive messages from any of a first group of the local fabric lanes for forwarding to any of a first group of the backplane lanes. The interconnect can be configurable to statically connect each of a second group of the local fabric lanes to a corresponding one of a second group of the backplane lanes. The controller can be configurable to remove lanes from the first group of the local fabric lanes and add lanes to the second group of the backplane lanes. The controller can be configurable to add lanes to the first group of the local fabric lanes and remove lanes from the second group of the backplane lanes. The at least one control device can be configured to provide, to the controller in response to detecting an increase in a number of active dynamic fabric devices installed in the dynamic fabric system, instructions to remove the lanes from the first group of the local fabric lanes. Alternatively or additionally, the at least one control device can be configured to provide, to the controller in response to detecting a decrease in the number, instructions to add the lanes to the first group of the local fabric lanes.

In some embodiments, a first number of lanes in the first group of the backplane lanes can equal a second number of lanes in the second group of the local fabric lanes. In some embodiments, the at least two dynamic fabric devices can include a second dynamic fabric device. The first group of the backplane lanes connects to an interconnect of the second dynamic fabric device. Each static connection can include a re-timer.

In some embodiments, the dynamic fabric system can further include a signal backplane device and a control backplane device. The signal backplane device can be connected to the at least two dynamic fabric devices and configured to implement the backplane. The control backplane device can be connected to the at least two dynamic fabric devices and the at least one control device. The control backplane device can be configured to enable communication between the at least one control device and each of the at least two dynamic fabric devices.

In some embodiments, the at least one control device can be configured to receive an automatic or manual indication of insertion or extraction of a dynamic fabric device into the dynamic fabric system. In various embodiments, the at least one control device can be configured to provide the instructions to the controller in response to the automatic or manual indication.

In some embodiments, the at least two dynamic fabric devices can include a second dynamic fabric device. The first dynamic fabric device can be configured to provide an automatic failure indication concerning the second dynamic fabric device to the at least one control device. The at least one control device can be configured to receive the automatic failure indication and provide the instructions to add the lanes to the first group of the local fabric lanes in response to receiving the automatic failure indication.

In some embodiments, the at least two dynamic fabric devices can include a second dynamic fabric device. The second dynamic fabric device can be configured to provide an automatic failure indication concerning the second dynamic fabric device to the at least one control device. The at least one control device can be configured to receive the automatic failure indication and provide the instructions to add the lanes to the first group of the local fabric lanes in response to receiving the automatic failure indication.

The disclosed embodiments include a method of configuring a dynamic fabric system. The method can include determining a number of dynamic fabric devices installed in the dynamic fabric system and configuring the dynamic fabric devices. Configuration of a first dynamic fabric device can include a set of operations. An operation can include configuring a local switch to receive messages from a first group of local fabric lanes for forwarding to a first group of backplane lanes. Another operation can include configuring each of a second group of the local fabric lanes to statically connect to a corresponding one of a second group of the backplane lanes. A number of the backplane lanes in the first group of the backplane lanes can equal a number of the local fabric lanes in the second group of the local fabric lanes.

In some embodiments, the second group of the backplane lanes can include subgroups of the backplane lanes, the backplane lanes in each subgroup connected to another one of the dynamic fabric devices. A number of the backplane lanes in each of the subgroups can equal a number of the local fabric lanes in the first group of the local fabric lanes.

In some embodiments, configuration of the first dynamic fabric device can further an operation of detecting, by the local switch, a lane of a network interface device in another one of the dynamic fabric devices through a lane in the first group of backplane lanes.

In some embodiments, the dynamic fabric devices can include a second dynamic fabric device. The configuration of the dynamic fabric devices can further include providing instructions, to at least one of the first dynamic fabric device and the second dynamic fabric device, to prevent the second dynamic fabric device from forwarding messages to the first dynamic fabric device during the configuration of the first dynamic fabric device.

In some embodiments, the determination of the number of dynamic fabric devices and the configuration of the first dynamic fabric device can be performed in response to a manual indication of insertion of a second dynamic fabric device into the dynamic fabric system or removal of the second dynamic fabric device from the dynamic fabric system; or an automatic indication of a failure of the second dynamic fabric device.

In some embodiments, configuring a first lane of the second group of the local fabric lanes to statically connect to a corresponding first lane of the second group of the backplane lanes can include reconfiguring a serializer/deserializer associated with the first lane as a re-timer.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIGS. 1B and 1D depict exemplary connections between dynamic fabric devices of a dynamic fabric system, consistent with disclosed embodiments.

DETAILED DESCRIPTION

Figure 1A:
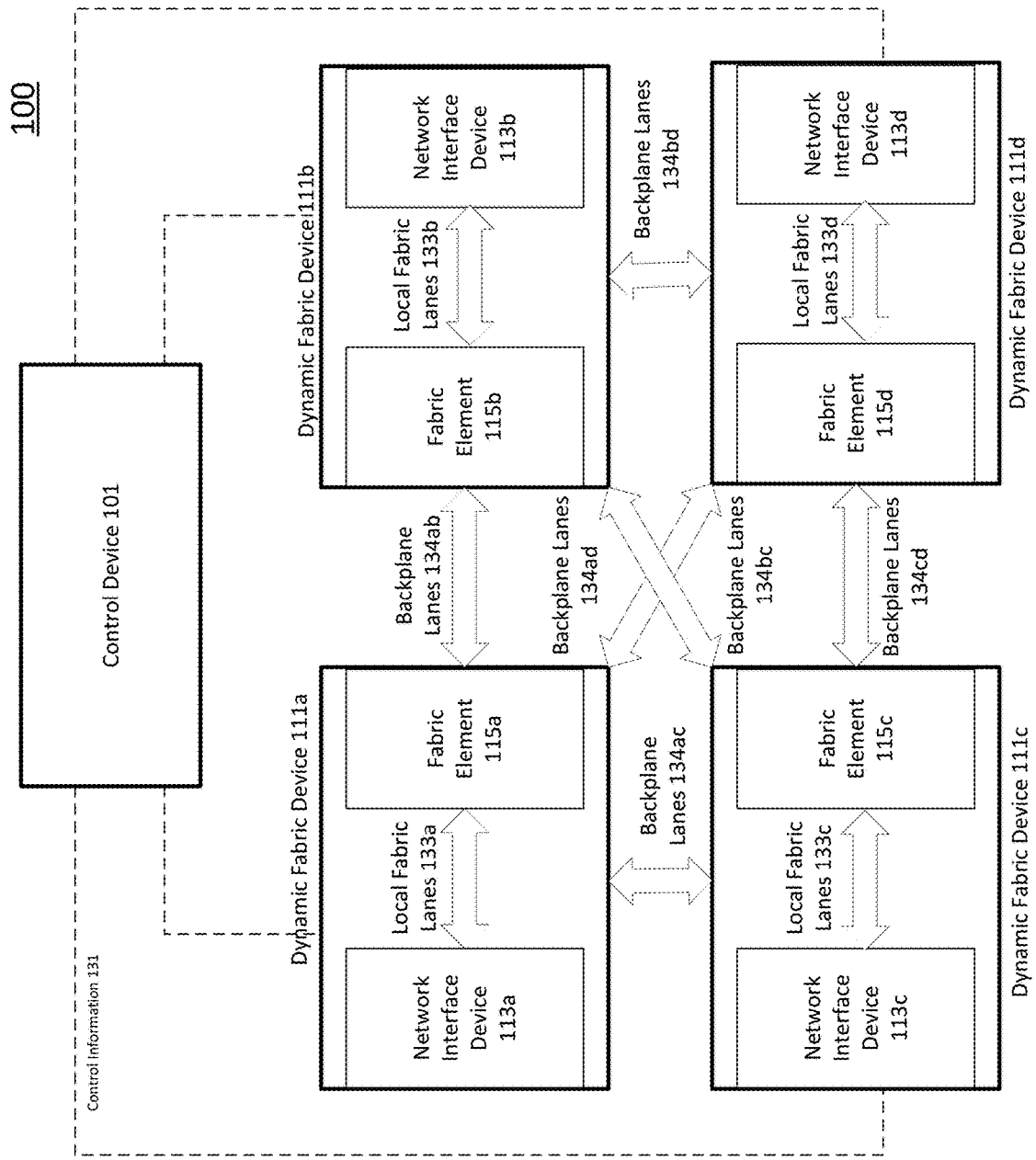
FIG. 1A depicts an exemplary schematic of a dynamic fabric system, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

The performance of a Clos architecture can depend on the relative number of I/O devices and switch devices. A connection between an unused input of an I/O device in the ingress stage and an unused output of an I/O device in the egress stage can be deemed "blocked" when the input and output cannot be connected without having to rearrange existing connections. A Clos architecture is "nonblocking"—any unused input can always be connected to an unused output—when $m \geq 2n-1$. When $m < 2n-1$, a blocking probably can be determined according to known methods. This blocking probability increases as m decreases. Furthermore, the bandwidth of the Clos architecture can depend on the number of switch devices. In some embodiments, for example, the input capacity of each I/O device can be proportional to the number of switches in the switch stage. Furthermore, real-world Clos architectures may include additional, redundant switch devices, beyond the number required to ensure a desired degree of performance, to ensure that the system functions with a desired degree of reliability.

Clos architectures may be implemented using Clos systems that provide a predetermined number of switch devices and I/O devices in a predetermined configuration. For example, such a system may include an ingress layer having 12 I/O devices (each with 50 inputs), a middle layer having 6 switch devices, and an egress layer of 12 I/O devices (each with 50 outputs). In this non-limiting example (e.g., r=12, m=6, and n=50), the Clos architecture may be configured to map each of 12 inputs for each of the 6 switch devices to an output in each of the 12 I/O devices in the ingress stage. Similarly, each of 12 outputs for each of the 6 switch devices can be mapped to an input in each of the 12 I/O devices in the egress stage. Such a device can be configured to provide 5+1 coverage, where all of the switch devices are active and each one may provide redundancy in case one of the switch devices fails.

As existing Clos systems may offer predetermined configurations, a service provider may be obligated to select such a system based on their desired eventual bandwidth and redundancy requirements. Switch devices and I/O devices can be extremely expensive and such a system may include more switch devices or I/O devices than warranted by the immediate needs of the service provider. For example, a Clos system may include 6 switch devices and may be designed to support 24 I/O devices. However, the system may be designed so that five I/O devices may be sufficient to satisfy the immediate needs of the service provider. In this example, an additional cost per I/O device attributable to the switches is 1.2 times the cost of each individual switch (as there are six switches and only five I/O devices). These additional "entrance" costs, which a service provider may incur in establishing their network, may prevent service providers from investing in otherwise suitable Clos systems.

Disclosed embodiments include dynamically configurable Clos systems. In some embodiments, the dynamically configurable Clos systems can be constructed from multiple dynamic fabric devices. Each dynamic fabric device can include a network interface element (which can serve as an input/output device for the network) and a fabric element (which can serve as a switch device for the network). In some embodiments, re-timer functionality of the fabric element of a dynamic fabric device can be used to interconnect between the network interface element of the dynamic fabric device and the network interface elements of other dynamic fabric devices in the dynamically configurable Clos systems.

Information received at the input of the network interface element in the origin dynamic fabric device can be routed to a local switch lane of the origin dynamic fabric device (e.g., according to a mapping maintained by origin dynamic fabric device, based on destination information in the received information, or using another suitable method). The local switch of the origin dynamic fabric device can forward the information from the local switch lane to a system switch lane of the origin dynamic fabric device. The system switch lane of the origin dynamic fabric device can be connected to a system interconnect lane of a destination dynamic fabric device. The system interconnect lane of the destination dynamic fabric device can be statically connected (e.g., using the re-timer functionality) to a local interconnect lane of the destination dynamic fabric device. The information can be routed from the local switch lane to an output of the network interface element of the destination dynamic fabric device (e.g., according to a mapping maintained by the destination dynamic fabric device, based on destination information in the received information, or using another suitable method). In this manner, information can be routed from the input of the origin dynamic fabric device to the output of the destination dynamic fabric device.

Consistent with disclosed embodiments, flow control mechanisms can ensure that fabric elements have the ability to route communications from network interface devices of an origin dynamic fabric device to corresponding fabric elements of destination dynamic fabric devices. Such flow control mechanisms can include a simple determination of whether a fabric lane is already being used, a credit-based flow control system in which egress network interface elements provide credits to ingress network interface devices to indicate availability, or other suitable methods. The disclosed embodiments are not limited to any particular flow control mechanism.

Consistent with disclosed embodiments, the connections between the dynamic fabric devices in the dynamically configurable Clos system can be updated when a dynamic fabric device is added or removed (e.g., in response to device failures or as the needs of the service provider change). Such dynamic reconfiguration can enable more efficient utilization of the I/O devices and switch devices making up the envisioned Clos system. For example, additional or redundant switch devices may not be required, as the dynamically configurable Clos system may detect and adapt to the failure or removal of a dynamic fabric device. Accordingly, a service provider can initially use a Clos system including only a single fabric device and add additional fabric devices as needed, avoiding the additional "entrance" costs associate with conventional Clos systems. In this manner, the disclosed embodiments provide a technological improvement in Clos implementations.

FIG. 1A depicts an exemplary schematic of a dynamic fabric system 100, consistent with disclosed embodiments. Dynamic fabric system 100 can include a control device 101 configured to provide instructions to one or more dynamic fabric devices. In this non-limiting example, dynamic fabric system 100 includes four dynamic fabric devices 111a to 111d. Each dynamic fabric device can include a network interface device (e.g., network interface devices 113a to 113d) and a fabric element (e.g., fabric element 115a to fabric element 115d). In each dynamic fabric device, the network interface device can be communicatively connected to the fabric element by local fabric lanes (e.g., local fabric lanes 133). The dynamic fabric devices can be connected to each other through one or more bundles of backplane lanes (e.g., backplane lanes 134ab, backplane lanes 134ac, backplane lanes 134ad, backplane lanes 134bc, backplane lanes 134bd, and backplane lanes 134cd, or the like). At least one backplane can include these bundles of backplane lanes. Each of the local fabric lanes and the backplane lanes can include a serial transmission link and a serial reception link (e.g., a serializer/deserializer "SerDes", or the like). The fabric element can include an interconnect (e.g., interconnect 117a to 117d) and a local switch (e.g., local switch 119a to 119d). Consistent with disclosed embodiments, control device 101 can provide control information (e.g., control information 131) to the dynamic fabric devices. The dynamic fabric devices can configure, according to the control information, the components of each dynamic fabric device to create the appropriate connections between the dynamic fabric devices.

Control device 101 can be configured to provide instructions to the dynamic fabric devices of dynamic fabric system 100. Control device 101 can include a processor (e.g., a central processing unit, microcontroller, graphical processing unit, or other suitable processor), a non-transitory computer memory for storing data and instructions, and at least one network interface controller. In some embodiments, the at least one network interface controller can be an ethernet controller (e.g., an ethernet switch, or the like). Control device 101 can be configured to provide high-level instructions to dynamic fabric devices using the at least one network interface controller. The high-level instructions can concern the overall status of the dynamic fabric system, consistent with disclosed embodiments. Such high-level instructions could include, as a non-limiting example, a message that a new dynamic fabric device had been inserted into a particular slot or port of dynamic fabric system 100. In some embodiments, the at least one network interface controller can be configured to communicate with the processor using a network (e.g., a serial gigabit media-independent ethernet interface, or another suitable interface). In some embodiments, control device 101 can also include a controller for performing low-level control over the dynamic fabric device. The controller can be an application specific integrated circuit (ASIC), field programmable gate array, microcontroller, or another suitable device for generating low-level instructions for consumption by the dynamic fabric device. In some embodiments, the low-level instructions can be generated in response to receipt of higher-level instructions from the processor of control device 101. The low-level instructions can concern device (e.g., network interface device or fabric element) settings on a dynamic fabric device, consistent with disclosed embodiments. Such a low-level instruction could include, as a non-limiting example, a command to reconfigure a serializer/deserializer on a fabric element as a re-timer. In some embodiments, the controller can be configured to communicate with the processor using an internal bus (e.g., a PCI express, Infiniband, or another suitable bus).

In some embodiments, dynamic fabric system 100 can include multiple controllers. One controller can be configured as an active controller and can provide instructions for configuring the dynamic fabric devices. The additional controllers can be configured as redundant or backup controllers. In some embodiments, should the active controller fail, one of the additional controllers can become the active controller. The disclosed embodiments are not limited to any particular technique for identifying failures in the active controller or for handing off control to a backup or redundant controller.

A dynamic fabric device (e.g., dynamic fabric devices 111*a* to 111*d*) can provide an ingress and egress point to dynamic fabric system 100 and can manage connections between itself and other dynamic fabric devices. In some embodiments, the dynamic fabric device can include a network interface device (e.g., network interface device 113*a* to 113*d*), a fabric element (e.g., fabric element 115*a* to 115*d*), local fabric lanes (e.g., local fabric lanes 133), a processor (e.g., a central processing unit, microcontroller, graphical processing unit, or other suitable processor), and a non-transitory computer memory for storing data and instructions. The dynamic fabric device can be connected to other dynamic fabric devices in dynamic fabric system 100 through one or more bundles of backplane lanes (e.g., dynamic fabric device 111*a* can be connected to dynamic fabric device 111*b* through backplane lanes 134*ab* and dynamic fabric device 111*c* can be connected to dynamic fabric device 111*d* through backplane lanes 134*cd*).

Local fabric lanes 133 can communicatively connect the network interface device and the fabric element of a dynamic fabric device. In some embodiments, each local fabric lane can provide a bidirectional communication link. The bidirectional communication link can be a serial communication link. It may be implemented using separate transmission and reception links. As a non-limiting example, a lane can include a differential transmission link and a differential reception link. Such a lane can be implemented using two pairs of conductors (e.g., two pairs of wires, two pairs of traces, or the like) and optionally a reference conductor (e.g., a ground wire, ground trace, ground plane, or the like).

A backplane (e.g., including bundles of backplane lanes, such as backplane lanes 134*ab*, backplane lanes 134*ac*, backplane lanes 134*ad*, backplane lanes 134*bc*, backplane lanes 134*bd*, and backplane lanes 134*cd*, or the like) can communicatively connect the fabric element of one dynamic fabric device to other dynamic fabric devices. Similar to local fabric lanes 133, the backplane lanes can, in some embodiments, provide a bidirectional communication link. The bidirectional communication link can be a serial communication link and can be implemented using separate transmission and reception links. In some embodiments, one or more structures can form the backplane by communicatively connecting the dynamic fabric devices (e.g., as described herein with respect to FIGS. 2A and 2B). In some embodiments, an arrangement of the backplane lanes in the backplane may be static. For example, backplane lanes 134*ab* may connect a particular input/output of fabric element 115*a* (e.g., a serializer/deserializer, or the like) with a particular output/input of fabric element 115*b* (e.g., a serializer/deserializer, or the like).

Consistent with disclosed embodiments, a number of backplane lanes can exceed a number of local fabric lanes. In some embodiments, each pair of fabric elements in dynamic fabric system 100 can be connected by a number of backplane lanes. This number of backplane lanes can equal the number of local fabric lanes connecting, in each dynamic fabric device in dynamic fabric system 100, the network interface devices and the fabric element. For example, when 48 local fabric lanes connect network interface device 113*a* to fabric element 115*a*, each of backplane lanes 134*ab*, backplane lanes 134*ac*, and backplane lanes 134*ad* can include 48 backplane lanes (e.g., 144 backplane lanes total). Consistent with disclosed embodiments, each dynamic fabric device can be configurable to form static connections between local fabric lanes and backplane lanes. As described herein, configuration of a dynamic fabric device can include selecting which (if any) backplane lane to connect to each particular local fabric lane.

The network interface device can be configured to provide an ingress and egress point to the dynamic fabric device. In some embodiments, the network interface device can provide fabric interface, traffic management, and packet processing functionality. In some embodiments, the network interface device can support internal (e.g., using an internal memory) or external (e.g., using an external memory accessible to the network interface device) buffering of communications traffic. In various embodiments, the network interface device can be configured to use extendable off-chip packet processing tables. The network interface device can be configured to provide information received from a local fabric lane to an output of the network interface device. In some embodiments, a mapping from the local fabric lane to the output can be maintained by the network interface device. In various embodiments, the mapping can be determined by the content of the received information (e.g., a destination header or address, or other suitable destination information). In some embodiments, the network interface device can be configured to support between 32 and 512 lanes of network-side communications (e.g., 128 lanes of communications into the dynamic fabric device, or the like). In some embodiments, the network interface device can be configured to support between 5 and 500 lanes of fabric-side communications (e.g., 48 local fabric lanes, or the like). In some embodiments, the network interface device can be configurable to directly interconnect with network interface devices on other dynamic fabric devices (e.g., in a mesh network, or the like). Such interconnections may be static and divided evenly between the other dynamic fabric devices. In some embodiments, the network interface device can be a fabric access processor (e.g., a Broadcom Arad-family, Jericho-family, or Qumran-family fabric access processor, or another suitable fabric access processor).

The fabric element can be configured to route communications traffic received from local fabric lanes to backplane lanes, consistent with disclosed embodiments. In some embodiments, the fabric element can be configured to provide at least one of self-routing or cell-base switching. In some embodiments, the fabric element can include or implement a local switch (e.g., local switch 119a to 119d). In some embodiments, the fabric element can include or implement an interconnect (e.g., interconnect 117a to 117d). Consistent with disclosed embodiments, the fabric element can be configured to support between 5 and 500 lanes of network-side communications (e.g., 48 local fabric lanes connecting the fabric element and the network interface device, or the like). The fabric element can also be configured to support between 15 and 1500 lanes of system-side communications (e.g., 144 backplane lanes connecting the fabric element and other fabric elements on other dynamic fabric devices, or the like). In some embodiments, the fabric element can be a Broadcom FE3600 or Ramon fabric element, or another suitable fabric element.

The local switch (e.g., local switch 119a to 119d) can route communications messages received from certain local fabric lanes (or certain backplane lanes) to corresponding system fabric lanes (or local fabric lanes). In some embodiments, the local switch can be self-routing. For example, a message received by the local switch (e.g., at a local fabric lane) can include destination information. The fabric element can determine a destination lane (e.g., a backplane lane) based on the destination information and forward the message to the destination lane. The choice of destination lane can depend on the destination information. In some instances, the destination may be connected to the same network interface element as originally received the message. In such instances, the destination lane may be a local fabric lane. In various embodiments, the destination information may specify a group of destinations (e.g., multicasting, or the like). In such instances, the local switch can forward the message to the lanes associated with each of these destinations. In various embodiments, the local switch can be configured to route message according to instructions received from a controller.

The interconnect (e.g., interconnect 117a to 117d) can be configured to link certain backplane lanes to corresponding local fabric lanes. Communications traffic received on a backplane lane (or corresponding local fabric lane) can be provided on the linked local fabric lane (or the backplane lane). In this manner, the interconnect can pass communications traffic between certain backplane lanes and corresponding local fabric lanes. The links provided by the interconnect can be static. For example, once the interconnect is configured to link a backplane lane to a local fabric lane, the lanes can remain linked until the interconnect is reconfigured (e.g., in response to the failure of a dynamic fabric device or the addition or removal of a dynamic fabric device).

In some embodiments, the interconnect can be implemented using a re-timer functionality of the fabric element. In general, a re-timer can be used to terminate and regenerate signal a data signal using a timing signal (e.g., a clock pulse, or the like). In some implementations, the re-timer can latch the signal into a synchronous memory element and then re-transmit the signal (e.g., on the next clock pulse). Consistent with disclosed embodiments, the fabric element can support receiving a signal for retiming on a first lane and transmitting the retimed signal on a second lane. In some embodiments, the lanes can be bidirectional, and the signal could also be received on the second lane and transmitted on the first lane. In this manner, the re-timer can form a static (and in some embodiments, bidirectional) interconnect between two lanes. Consistent with disclosed embodiments, one of the two lanes can be a local fabric lane connecting the network interface device with the fabric element, while the other lane can be a backplane lane communicatively connected to another dynamic fabric device. In such embodiments, the re-timer can also act to separate clock domains of the two dynamic fabric devices or address high frequency jitter in signals received from the other dynamic fabric device. In some embodiments, serializer/deserializers of the two lanes can be configured to provide the re-timer functionality.

In some embodiments, each dynamic fabric device can be configured to receive instructions from control device 101. The instructions can include at least one of high-level instructions received from a processor of control device 101 or low-level instructions received from a controller of control device 101. In some embodiments, the high-level instructions can be received over a network (e.g., an ethernet network, or the like). In various embodiments, instructions received from the controller can be processed using an ASIC, microcontroller, or FPGA, etc. of the dynamic fabric device. The output of the ASIC, microcontroller, or FPGA, etc. can be provided to the processor of the dynamic fabric device.

In response to receipt of the instructions and based on the instructions received, the processor can be configured to provide instructions to the network interface device and the fabric element. The instructions can be provided over a system bus (e.g., a PCI express bus, or the like). In some various embodiments, the instructions can configure the network interface device to maintain a mapping between inputs to the network interface device (e.g., from external devices, or the like) and local fabric lanes. The instructions can configure the network interface device and the fabric element to route information received on local switch lanes 137 to appropriate system switch lanes 141. The instructions can configure the fabric element to create static interconnects between local interconnect lanes 139 and system interconnect lanes 143. In some embodiments, the instructions can configure the dynamic fabric device to connect system switch lanes 141 to system interconnect lanes 143 of the remaining dynamic fabric devices.

Figure 1B:
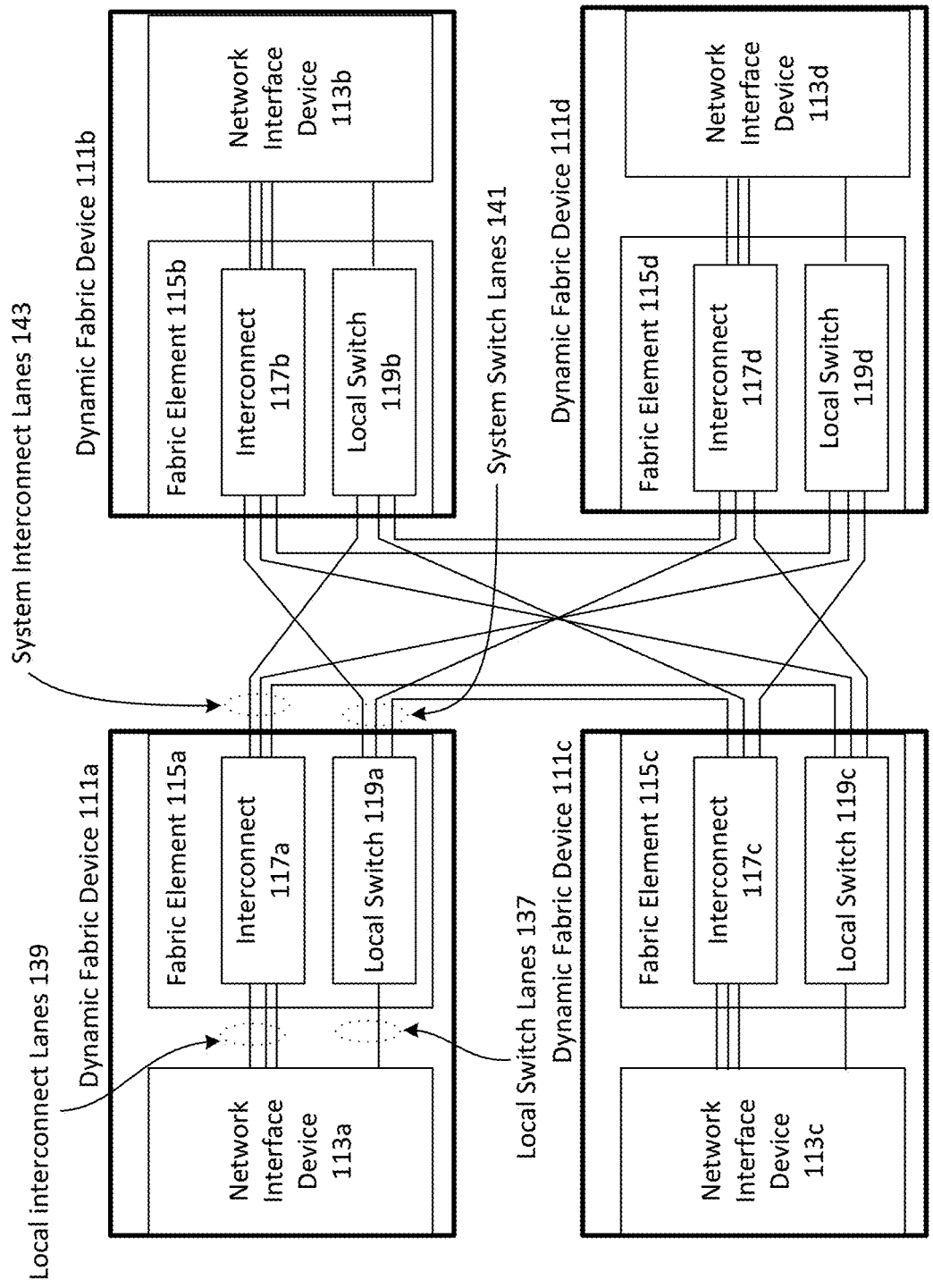

FIGS. 1B, 1C, and 1D further depict exemplary connections between dynamic fabric devices of a dynamic fabric system, consistent with disclosed embodiments. As depicted in these figures, local fabric lanes can be configured as local interconnect lanes (e.g., local interconnect lanes 139) or local switch lanes (e.g., local switch lanes 137). Local interconnect lanes can be connected at the fabric element to an interconnect (e.g., interconnect 117a), while a local switch (e.g., local switch 119a) can be configured to forward messages received from a local switch lane. Backplane lanes connected to each dynamic fabric device can be configured as system switch lanes or system interconnect lanes. System switch lanes can be configured to receive messages forwarded by the local switch. In some embodiments, the local switch can be configured to forward messages received from a system switch lane to a local switch lane. System interconnect lanes can be connected as the fabric element to the interconnect. Each system interconnect lane can form a static connection with a corresponding local interconnect lane. In can be appreciated that one end of a backplane lane can be configured as a system switch lane and the other end of the backplane lane can be configured as a system interconnect lane.

Consistent with disclosed embodiments, in at least some configurations of dynamic fabric system 100, only a subset of the backplane lanes can be configured as system switch lanes or system interconnect lanes. As a non-limiting example, dynamic fabric system 100 may include 4 dynamic fabric devices and 48 backplane lanes connect each pair of dynamic fabric devices. In this example, each dynamic fabric device may be connected to 144 backplane lanes. This dynamic fabric device may configure 36 of these backplane lanes as system interconnect lanes and 36 of these lanes as system switch lanes. Accordingly, 72 of the backplane lanes may not be used.

Consistent with disclosed embodiments, the dynamic fabric system can be configured, in accordance with instructions provided by a control device, to route messages received at an input of the origin dynamic fabric device to an output of a destination dynamic fabric device. In some embodiments, such messages can be provided by a network interface device of the origin dynamic fabric device (e.g., dynamic fabric device 111a) on a local switch lane (e.g., one of local switch lanes 137). A fabric element (e.g., fabric element 115a) of the origin dynamic fabric device can forward to message to a system switch lane (e.g., one of system switch lanes 141) that connects to a fabric element of the destination dynamic fabric device as system interconnect lane. In some embodiments, an interconnect of the destination dynamic fabric device can regenerate the message on a local interconnect lane of the destination dynamic fabric device. The network interface device of the destination dynamic fabric device can receive the message on the local interconnect lane. In some embodiments, messages can flow bidirectionally alone this communication path.

Figure 1E:
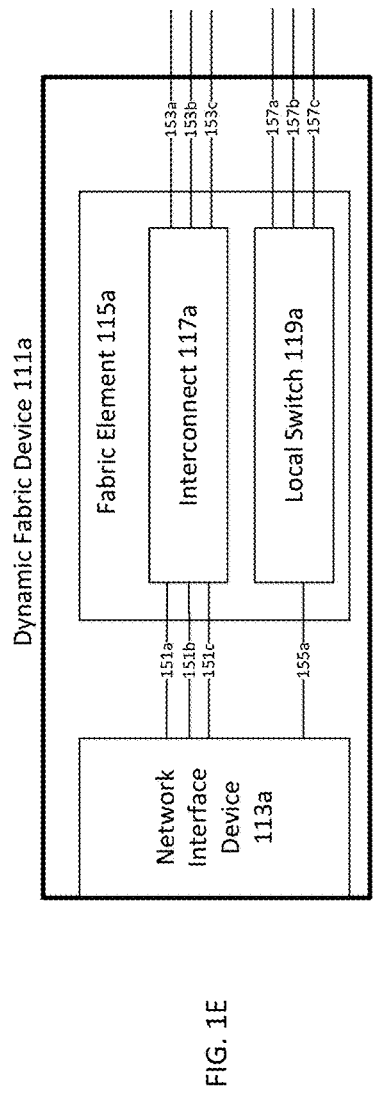
FIGS. 1E to 1G depict exemplary groups of lanes associated with connections between dynamic fabric devices of a dynamic fabric system, consistent with disclosed embodiments.

FIG. 1B depicts a dynamic fabric system 100 that includes four dynamic fabric devices 111a through 111d. FIG. 1E depicts exemplary details of the connections formed by one of these dynamic fabric devices. As depicted in FIGS. 1B and 1E, dynamic fabric device 111a can have three groups of system switch lanes. A first group of these system switch lanes (system switch lane group 157a, depicted in FIG. 1D) can connect to a corresponding group of system interconnect lanes of dynamic fabric device 111b. A second group of these system switch lanes (system switch lane group 157b, depicted in FIG. 1D) can connect to a corresponding group of system interconnect lanes of dynamic fabric device 111c. And a third group of these system switch lanes (system switch lane group 157b, depicted in FIG. 1D) can connect to a corresponding group of system interconnect lanes of dynamic fabric device 111d. A group of local switch lanes (local switch lane group 155a) can correspond to these system switch lanes. Messages can be received by the local switch on a lane in local switch lane group 155a and routed to one more system switch lanes. Messages can also be routed back on a different lane in local switch lane group 155a (e.g., when the origin and destination of the message are connected to the same network interface device).

As depicted in FIG. 1D, local interconnect lanes 139 can include three groups of local interconnect lanes. System interconnect lanes 143 can include three corresponding groups of system interconnect lanes. In some embodiments, each lane in a group of local interconnect lanes can connect to one lane in a corresponding group of system interconnect lanes. As a non-limiting example, local interconnect lane group 151a can correspond to system interconnect lane group 153a. Each lane in local interconnect lane group 151a can form a static connection with one lane in system interconnect lane group 153a. Local interconnect lane group 151b can correspond to system interconnect lane group 153b. Each lane in local interconnect lane group 151b can form a static connection with one lane in system interconnect lane group 153b. Local interconnect lane group 151c can correspond to system interconnect lane group 153c. In some embodiments, each lane in local interconnect lane group 151c can form a static connection with one lane in system interconnect lane group 153c.

As a non-limiting example, when the local fabric lanes include 48 lanes and there are four devices in dynamic fabric system 100, system switch lanes 141 can include 36 lanes. These 36 lanes can be divided between system switch lane groups 157a to 157c. In this non-limiting example, each system switch lane group can include 12 lanes. Each group of system switch lanes can be connected to a corresponding group of 12 system interconnect lanes of another dynamic fabric device. System interconnect lanes 143 can also include 36 lanes. These 36 lanes can be divided between system interconnect lane groups 153a to 153c. In this non-limiting example, each system interconnect lane group can include 12 lanes. Each group of system interconnect lane groups 153a to 153c can be connected to a corresponding group of local interconnect lane groups 151a to 151c. In this non-limiting example, each local interconnect lane group can include 12 lanes. Each system interconnect lane can be statically connected to a local interconnect lane (e.g., 36 static connections in total). In some embodiments, local switch lane group 155a can correspond to system switch lane groups 157a to 157c. Local switch lane group 155a can include 12 local switch lanes. Messages received on one of the 12 local switch lanes can be provided on one or more of the 36 system switch lanes (or returned on another local switch lane). Messages received on one of the 36 system switch lanes can be provided on one or more of the 12 local switch lanes.

Figure 1F:
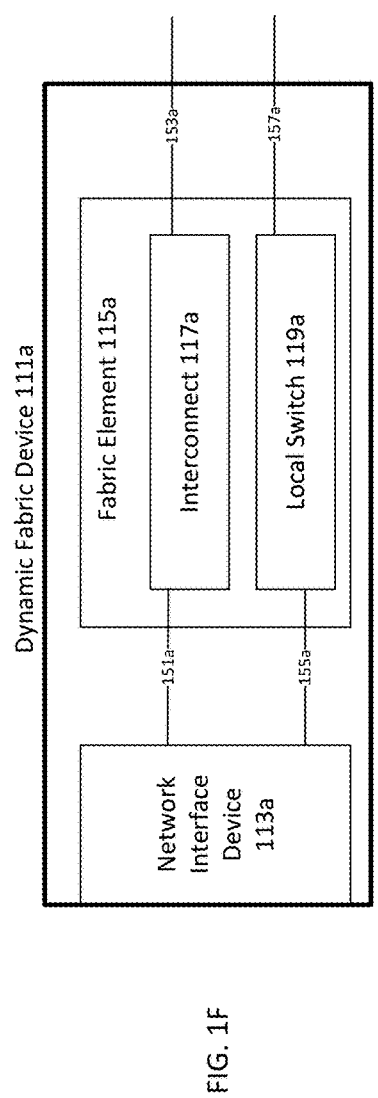

FIG. 1C depicts a dynamic fabric system 100 that includes two dynamic fabric devices. FIG. 1F depicts exemplary details of the connections formed by one of these dynamic fabric devices. As depicted in FIGS. 1C and 1F, dynamic fabric device 111a can have a single group of system switch lanes (e.g., system switch lane group 157a). These system switch lanes can connect to a corresponding group of system interconnect lanes of the other dynamic fabric device.

As a non-limiting example, when the local fabric lanes include 48 lanes and there are two devices in dynamic fabric system 100, system interconnect lanes 143 can include 24 lanes. A single group can include these lanes (e.g., system interconnect lane group 153a). Each of system interconnect lanes 143 can be connected to a corresponding system switch lane of the other dynamic fabric device. Each system interconnect lane can be statically connected to a local interconnect lane (e.g., 24 local interconnect lanes in total). System switch lanes 141 can also include 24 lanes in a single group (e.g., system switch lane group 157a). In some embodiments, local switch lane group 155a can correspond to system switch lane group 157a. Local switch lane group 155a can include 24 local switch lanes. Messages received on one of the 24 local switch lanes can be provided on one or more of the 24 system switch lanes (or returned on another local switch lane). Messages received on one of the 24 system switch lanes can be provided on one or more of the 24 local switch lanes.

Figure 1G:
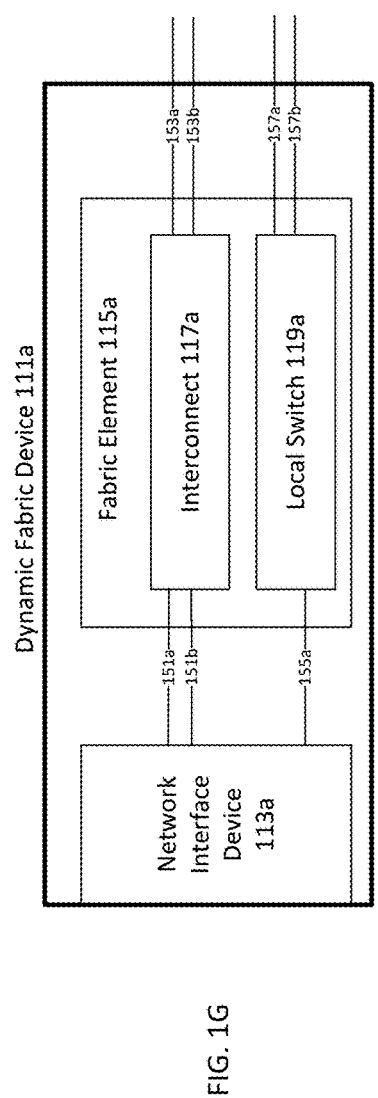

FIG. 1D depicts a dynamic fabric system 100 that includes three dynamic fabric devices. FIG. 1G depicts exemplary details of the connections formed by one of these dynamic fabric devices. As depicted in FIGS. 1D and 1G, dynamic fabric device 111a can have two groups of system switch lanes (e.g., system switch lane groups 157a and 157b). Each of these groups of system switch lanes can connect to a corresponding group of system interconnect lanes of dynamic fabric device 111b or dynamic fabric device 111d.

As a non-limiting example, when the local fabric lanes include 48 lanes and there are three devices in dynamic fabric system 100, system switch lanes 141 can include 32 lanes (e.g., in two groups of 16 lanes each) and system interconnect lanes 143 can include 32 lanes (e.g., in two groups of 16 lanes each). Each system interconnect lane can be statically connected to a local interconnect lane (e.g., 32 local interconnect lanes in total). In some embodiments, local switch lane group 155a can correspond to system switch lane groups 157a and 157b. Local switch lane group 155a can include 16 local switch lanes. Messages received on one of the 16 local switch lanes can be provided on one or more of the 32 system switch lanes (or returned on another local switch lane). Messages received on one of the 32 system switch lanes can be provided on one or more of the 16 local switch lanes.

Accordingly, consistent with disclosed embodiments, when N is the number of dynamic fabric devices in dynamic fabric system 100 and L is the number of local fabric lanes 133, then L/N is the number of local switch lanes, the number of system switch lanes 141 is L(N−1)/N, and the number of system switch lanes 141 connected to each other dynamic fabric device can be L/N. In some embodiments, the number of system interconnect lanes 143 can be L(N−1)/N, as each system interconnect lane can be connected to a system switch lane. The number of local interconnect lanes 139 can be L(N−1)/N as each local interconnect lane can be statically interconnected with a system interconnect lane. In various embodiments, the number of local switch lanes can be less than the number of system switch lanes (e.g., the local switch can associate each local switch lane with multiple corresponding system switch lanes). In such embodiments, the network interface device can be configured to map each local switch lane to multiple network inputs and outputs.

Figure 2A:
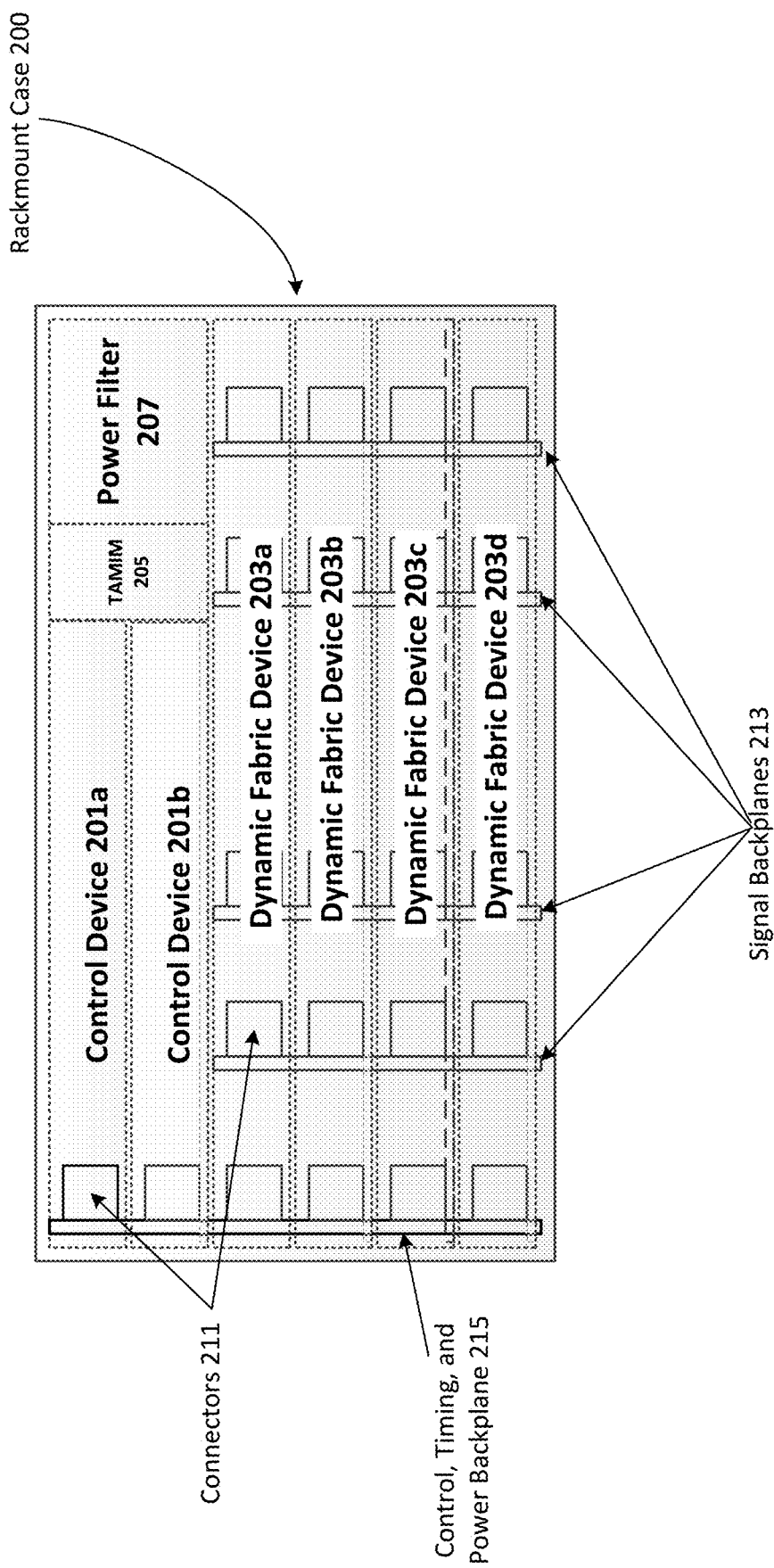
FIGS. 2A and 2B depict an exemplary physical layout of a dynamic fabric system, consistent with disclosed embodiments.
Figure 2B:
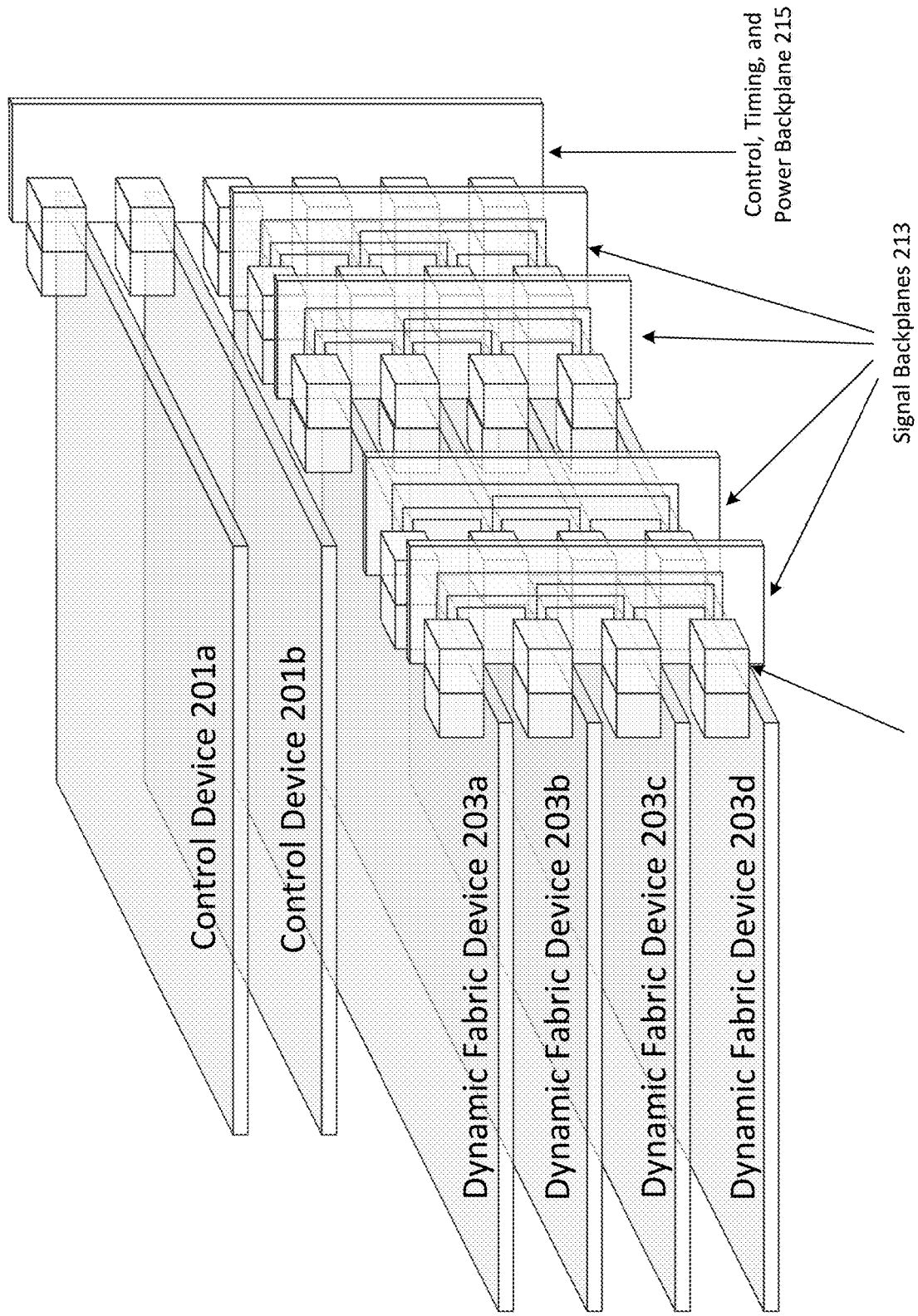

FIGS. 2A and 2B depict an exemplary physical layout of a dynamic fabric system (e.g., dynamic fabric system 100), consistent with disclosed embodiments. As would be appreciated by those of skill in the art, the implementation depicted in FIGS. 2A and 2B is not intended to be limiting. Other form factors could be used. Additionally, components depicted in FIGS. 2A and 2B can be combined to yield fewer components (e.g., each of active control device 201a and backup control device 201b can be combined with a modular timing unit and a power filter, or one or more of the dynamic fabric devices can be combined, or a single signal backplane can replace the four signal backplanes depicted, etc.), or divided to yield more components. Furthermore, additional components providing additional functionality can be added, or components removed, without departing from the envisioned embodiments.

FIG. 2A provides a front view of the dynamic fabric system. In this non-limiting example, the dynamic fabric system can be arranged in a rackmount case 200. Rackmount case 200 can be 6 rack units high (e.g., six times 1.75" high, or 10.5" high). In this embodiment, the dynamic fabric system can include four dynamic fabric devices (e.g., dynamic fabric devices 203a to 203d), which can each have a 1 U line-card form factor. The four dynamic fabric devices can occupy the bottom four rows of rackmount case 200. The top two rows of the rackmount case can be occupied by two control devices (an active control device 201a and a backup control device 201b). The two upper rows can also include a modular timing unit, such as a Timing, Alarms, Management Interface Module (e.g., TAMIM 205 as depicted in FIG. 2A). The modular timing unit can provide a precision time base for the dynamic fabric devices and other components of the dynamic fabric system. The two upper rows can also include one or more power filters (e.g., power filter 207). Active control device 201a, backup control device 201b, TAMIM 205, and power filter 207 can be communicatively connected to dynamic fabric devices 203a to 203d through control, timing, and power backplane 215. The components in each row of rackmount case 200 can be connected to Control, Timing and Power Backplane 215 through a connector (e.g., one of connectors 211). Similarly, dynamic fabric devices 203a to 203d can be interconnected through signal backplanes 213. In some embodiments, signal backplanes 213 can implement backplane lanes 134ab, backplane lanes 134ac, backplane lanes 134ad, backplane lanes 134bc, backplane lanes 134bd, and backplane lanes 134cd).

FIG. 2B provides an isometric view of the dynamic fabric system (excluding TAMIM 205 and Power Filter 207). As depicted in this view, the connectors can include a portion mated to a backplane and a portion mated to each device. Furthermore, as depicted, each connector mated to one of signal backplanes 213 can also be connected to each other connector mated to that one of signal backplanes 213.

Figure 3:
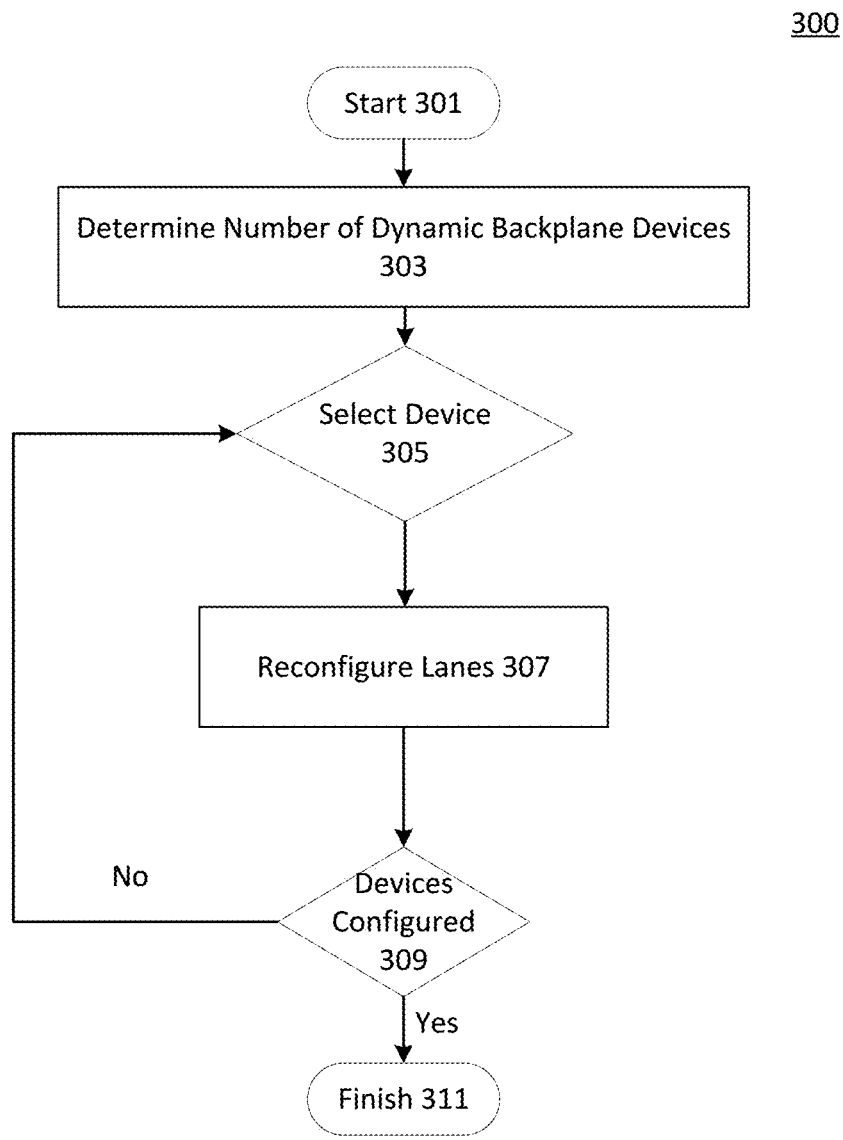
FIG. 3 depicts a flowchart illustrating an exemplary method for dynamically reconfiguring the dynamic fabric system, consistent with disclosed embodiments.

FIG. 3 depicts a flowchart illustrating an exemplary method 300 for dynamically reconfiguring a dynamic fabric system (e.g., dynamic fabric system 100), consistent with disclosed embodiments. Consistent with disclosed embodiments, method 300 can be performed automatically by the dynamic fabric system. In various embodiments, method 300 can be performed in response to an automatically detected trigger, or in response to a manual indication or instruction. Method 300 can enable dynamic fabric system 100 to operate without using a redundant or fallback switch device, lowering the complexity and cost of the dynamic fabric system as compared to conventional Clos switching systems. Furthermore, method 300 can enable a service provider to progressively increase a capacity of dynamic fabric system 100 by adding additional dynamic fabric devices. The ability to add dynamic fabric devices as needed, rather than initiating service with a full complement of switch devices, can reduce entrance costs and make service providers more willing to invest in Clos network switching systems.

Method 300 can start in step 301. In step 301, the dynamic fabric system can automatically detect that reconfiguration is required or desirable, or can receive a manual reconfiguration trigger. Consistent with disclosed embodiments, a control device of the dynamic fabric system (e.g., control device 101) can receive an indication of a change in the number of dynamic fabric devices installed the dynamic fabric system.

In some embodiments, the received indication of a change in the number of dynamic fabric devices can be a manual indication. For example, a user can interact with the dynamic fabric device to indicate manual indication of insertion or extraction of a dynamic fabric device. In some embodiments, the indication can be provided through a physical control (e.g., through pushbutton, switches, or the like). In various embodiments, the indication can be provided through a user interface provided by the dynamic fabric device (e.g., a display of the dynamic fabric device, or a graphical user interface displayed by a computing device in communication with, e.g., "dialing in to" the dynamic fabric device).

Manual card insertion can include physically inserting the dynamic fabric card into the dynamic fabric system. The dynamic fabric card can then be started and can boot up. The control device can provide instructions (e.g., as described herein) to the dynamic fabric card to configure the interconnect and the local switch of the dynamic fabric card.

In some embodiments, the received indication of a change in the number of dynamic fabric devices can be an automatic indication. In some embodiments, the automatic indication can indicate that a dynamic fabric device has been added or removed. In various embodiments, the automatic indication can indicate that a dynamic fabric device has failed.

In some embodiments, a dynamic fabric device can provide an indication that another dynamic fabric device has failed. For example, a first dynamic fabric device can be configured to detect a loss of traffic from another, second dynamic fabric device, a lack of acknowledgements from the second dynamic fabric device, a loss of a heartbeat signal from the second dynamic fabric device, or another suitable indicator of failure. The disclosed embodiments are not limited to a particular method of detecting the failure of the second dynamic fabric device. In response to detection of the failure of the second dynamic fabric device, the first dynamic fabric device can provide an automatic failure indication concerning the second dynamic fabric device to the at least one control device. In some embodiments, the indication can specify at least one of the device that failed, a time of the failure, or a type of the failure (e.g., loss of traffic, loss of heartbeat signal, anomalous responses to requests, or the like).

In some embodiments, the dynamic fabric device can provide an indication that it has failed. For example, the dynamic fabric device can include a built-in self-test (BIT) module. Using the BIT module, the dynamic fabric device can detect a fault. The dynamic fabric device can then provide an indication of the fault to the control device. In some embodiments, the indication can include a report describing the failure. The report can include at least one of an indication of a component that failed, a time of the failure, or a type of the failure.

After starting in step 301, the dynamic fabric system can determine a number of connected dynamic fabric devices. The determination can be performed in response to receipt or detection of the indication of a change in a number of dynamic fabric devices in the dynamic fabric system (e.g., in step 301). In some embodiments, a control device can track the number of dynamic fabric devices installed (e.g., the dynamic fabric device can increment the number of dynamic fabric devices installed when a new device is added and decrement the number when a dynamic fabric device is removed or fails). In various embodiments, a control device can query or poll to determine the dynamic fabric devices installed. For example, the control device could broadcast a request on a network connecting the control device to the dynamic fabric devices. In response to the request, installed dynamic fabric devices could provide a response (e.g., a status indication or the like). Based on the response, or on the number of responses, the control device could determine the number of attached, functional dynamic fabric devices. In some embodiments, the control device can receive a manual indication of the number of dynamic fabric devices installed. For example, a user can input the number installed after adding or removing a dynamic fabric device.

After determining the number of devices in step 303, the control device can select a dynamic fabric device in step 305. The configuration of this dynamic fabric device can then be updated. In some embodiments, the dynamic fabric device can be selected deterministically. In some embodiments, the dynamic fabric devices can have an ordering and the device can be selected according to the ordering (e.g., the devices can be selected and updated iteratively according to the ordering). For example, each dynamic fabric device can be inserted into a slot or connector. The connector can have an ordering (e.g., connector 0, connector 1, connector 2, etc.). The dynamic fabric devices can inherit the ordering of the connector to which they are connected. When devices are selected for updating, they can be selected from the highest number connector to the lowest number connector. For example, dynamic fabric devices can be connected to connectors 0, 1, and 3. The dynamic fabric device connected to connector 1 can fail. In response to detecting the failure, the control device can select the dynamic fabric device connected to connector 3, reconfigure that connector, and then select the dynamic fabric device connected to connector 0 and reconfigure that connector. Suppose a new dynamic fabric device is subsequently connected to connector 2. Then the control device can select the dynamic fabric device connected to connector 3, reconfigure that connector, then select the dynamic fabric device connected to connector 2, reconfigure that connector, then select the dynamic fabric device connected to connector 0, and reconfigure that connector. In various embodiments, the control device can select a dynamic fabric device for updating based on availability or current traffic handled by the dynamic fabric device. In some embodiments, the control device can randomly select a dynamic fabric device for updating.

As described herein, the control device can provide instructions to reconfigure the selected dynamic fabric device. In various embodiments, the control device can further provide instructions to communicatively isolate the selected dynamic fabric device. Such isolation can be accomplished by deactivating communication links with the selected dynamic fabric device (e.g., by deactivating the serializer/deserializers of the network interface device of the failed network interface device, or the like). In this manner, the dynamic fabric system can prevent the loss of message traffic during configuration. In some embodiments, the dynamic fabric system can continue message distribution over communication links between the remaining dynamic fabric devices.

As a non-limiting example of the need for and the implementation of such communicative isolation, each network interface device in each dynamic fabric device can be configured to automatically check for connectivity with other network interface devices. Such automatic detection can be performed by providing configuration messages through the serializer/deserializer of the network interface device. In some embodiments, the recipients of the messages (e.g., the network interface devices of other dynamic fabric devices in the dynamic fabric system) can detect the configuration messages and recognize the network interface device of the newly installed dynamic fabric device as a reachable endpoint. But the newly installed dynamic fabric device may require further configuration to operate properly. Thus, to prevent other network interface devices from attempting to route traffic to the newly installed dynamic fabric device (potentially causing a traffic hit), the control device can be configured to providing "do not use" instructions to at least one of the network interface device of the newly installed dynamic fabric system (to prevent the new network interface device from attempting such automatic configuration—such as by deactivating serializer/deserializers of the newly installed dynamic fabric device) or the network interface devices of the previously installed dynamic fabric systems (to prevent configuration of the previously installed network interface devices in response to receiving the configuration messages). Once configuration of the newly installed dynamic fabric device is complete, the control device can be configured to providing "use" instructions to at least one of the network interface device of the newly installed dynamic fabric system (to enable the new network interface device to attempt such automatic configuration—such as by reactivating serializer/deserializers of the newly installed dynamic fabric device) or the network interface devices of the previously installed dynamic fabric systems (to enable configuration of the previously installed network interface devices in response to receiving the configuration messages).

In step 307, the selected dynamic fabric device can be reconfigured with the appropriate lane groups. Such reconfiguration can include providing instructions to the network interface device or the fabric element to reconfigure lanes of the selected dynamic fabric device. The instructions can include high-level or low-level instructions as described herein. The instructions can be received by a processor of the selected dynamic fabric device. Based on and in response to the instructions, the processor can configure the lanes of the selected dynamic fabric device. Consistent with disclosed embodiments, the processor can generate instructions for the network interface device and the fabric elements. The network interface device and the fabric element can execute the instructions, configuring or reconfiguring the lanes. The disclosed embodiments are not limited to any particular reconfiguration ordering. Furthermore, while described as concerning the entire selected device, the communicative isolation described with regards to step 305 can be performed in step 309. Such communicative isolation can be performed on a lane-by-lane basis, with individual lanes being isolated until they are reconfigured.

Device Failure or Removal

In instances in which a dynamic fabric device fails or is removed, the remaining dynamic fabric devices can be configured to tear down connections with the failed or removed device and create new connections with the remaining devices. Backplane and fabric lanes in each remaining dynamic fabric device can be reconfigured as follows:

A number of the local switch lanes can increase. In some embodiments the number of local switch lanes can be L/N, where L is the number of local fabric lanes and N is the number of installed dynamic fabric devices. Accordingly, decreasing the number of installed dynamic fabric devices can cause the dynamic fabric device to increase the number of local switch lanes. The fabric element of the dynamic fabric device can be reconfigured such that local interconnect lanes become local switch lanes.

A number of the system interconnect lanes connected to each of the remaining dynamic fabric devices can increase. In some embodiments, this number can be L/N, where L is the number of local fabric lanes and N is the number of installed dynamic fabric devices. Accordingly, decreasing the number of installed dynamic fabric devices can cause the dynamic fabric device to increase the number of system interconnect lanes connected to each installed dynamic fabric device.

An overall number of the system interconnect lanes and system switch lanes can decrease. As each dynamic fabric device is connected to N−1 other devices, the total number of system interconnect lanes connected to each device is L(N−1)/N. Likewise, the total number of system switch lanes connected to each device is L(N−1)/N. Decreasing the number of dynamic fabric devices therefore decreases the overall number of system interconnect lanes and system switch lanes.

In some embodiments, the dynamic fabric device can reconfigure the fabric element to increase the number of local switch lanes and the overall number of the system interconnect lanes and system switch lanes. Consistent with disclosed embodiments, the dynamic fabric device can be reconfigured to break static connections between certain local fabric lanes and backplane lanes connected to the failed or removed dynamic fabric device.

The dynamic fabric device can then reconfigure a subset of the particular local fabric lanes as local interconnect lanes. Such local interconnect lanes can be connected to the remaining dynamic fabric devices. In some embodiments, the interconnect can create static connections between the subset of local fabric lanes and backplane lanes connected to the remaining dynamic fabric devices. These new static connections can enable local switches of the remaining dynamic fabric devices to detect the network interface device of the dynamic fabric device being reconfigured. These local switches can then forward messages to the network interface device of the dynamic fabric device being reconfigured using the new static connections. In this manner, the subset of the particular local fabric lanes can be configured as local interconnect lanes. The backplane lanes can thus be configured as system interconnect lanes (of the dynamic fabric device being reconfigured) connected to system switch lanes (of the remaining dynamic fabric devices).

Consistent with disclosed embodiments, the dynamic fabric device can reconfigure the remainder of the particular local fabric lanes as local switch lanes. The local switch can be configured to forward messages received from these lanes to system switch lanes connected to system interconnect lanes of other dynamic fabric devices.

Example of Device Removal or Failure

As a non-limiting example, as depicted in FIG. 1B, dynamic fabric device 111a can include 12 local fabric lanes configured as local interconnect lanes (e.g., the lanes in local interconnect lane group 151c). These local fabric lanes can be connected to 12 backplane lanes through interconnect 117a. The 12 backplane lanes can be configured as system switch lanes connected to another dynamic fabric device. Similarly, 12 local fabric lanes can be configured as local switch lanes (e.g., the lanes in local switch lane group 155a). The local switch can be configured to forward messages received from these local switch lanes to one or more of 36 backplane lanes. The backplane lanes can be configured as system switch lanes connected to system interconnect lanes of other dynamic fabric devices (e.g., three groups, such as system switch lane groups 157a to 157c, of 12 system switch lanes each).

Dynamic fabric device 111a can be reconfigured in response to removal or failure of one of the other three dynamic fabric devices in dynamic fabric system 100. In this non-limiting example, interconnect 117a can be reconfigured to break the static connections between the local fabric lanes comprising local interconnect lane group 151c and the backplane lanes comprising system interconnect lane group 153c. Interconnect 117a can then be reconfigured to create static connections between some of these local fabric lanes and particular backplane lanes. For example, interconnect 117a can create static connections between four of these local fabric lanes and four backplane lanes connected to a first one of the two remaining dynamic fabric devices. In this manner, four local interconnect lanes can be added to local interconnect lane group 151a and four system interconnect lanes can be added to system interconnect lane group 153a. Likewise, interconnect 117a can be reconfigured to create static connections between another four of these local fabric lanes and four backplane lanes connected to a second one of the two remaining dynamic fabric devices. In this manner, four local interconnect lanes can be added to local interconnect lane group 151b and four system interconnect lanes can be added to system interconnect lane group 153b.

In this non-limiting example, local switch 119a can be reconfigured to forward messages received from the remaining four local fabric lanes. In this manner, four local switch lanes can be added to local switch lane group 155a. As the other two remaining dynamic fabric devices are reconfigured, the interconnects in those devices will each create four new static connections with backplane lanes connected to dynamic fabric device 111a. Local switch 119a will detect the network interface devices in these other dynamic fabric devices through these new static connections. In this manner, four new system switch lanes will be added to system switch lane group 157a and four new system switch lanes will be added to system switch lane group 157b.

Device Installation or Activation

When a new dynamic fabric device is added to dynamic fabric system 100, the lanes associated with previously installed dynamic fabric devices (and with the newly added or activated device) can be reconfigured. While a similar reconfiguration process can occur when a previously installed device is activated, for clarity the following discuss refers only installation of a new device. A portion of the connections between the previously installed dynamic fabric devices can be torn down, freeing local fabric lanes to handle communications with the newly installed dynamic fabric device. Backplane and fabric lanes can be reconfigured as follows:

A number of the local switch lanes in the previously installed dynamic fabric devices can decrease. In some embodiments the number of local switch lanes can be L/N, where L is the number of local fabric lanes and N is the number of installed dynamic fabric devices. Accordingly, increasing the number of installed dynamic fabric devices can cause a decrease in the number of local switch lanes in the previously installed dynamic fabric devices. The fabric element of such dynamic fabric devices can be reconfigured such that local switch lanes become local interconnect lanes.

A number of the system interconnect lanes in the previously installed dynamic fabric devices that are connected to each other previously installed dynamic fabric device can decrease. In some embodiments this number can be L/N, where L is the number of local fabric lanes and N is the number of installed dynamic fabric devices. Accordingly, increasing the number of installed dynamic fabric devices can cause the number of system interconnect lanes in the previously installed dynamic fabric devices that are connected to each other previously installed dynamic fabric device to decrease.

Consistent with disclosed embodiments, the fabric elements of each previously installed dynamic fabric device can be reconfigured to create local interconnect lanes associated with the newly installed dynamic fabric device. The interconnect of the local fabric element can be reconfigured to break static connections associating local interconnect lanes with other previously installed dynamic fabric devices and create static connections associating these local interconnect lanes with the newly installed dynamic fabric device. Additionally, by creating new static connections, local switch lanes can be reconfigured as local interconnect lanes associated with the newly installed dynamic fabric device.

The new static connections can connect the local fabric lanes of the previously installed dynamic fabric devices and backplane lanes (the backplane lanes in turn connected to the newly installed dynamic fabric device). These new static connections can enable the local switch of the newly installed dynamic fabric device to detect the network interface devices of the previously installed dynamic fabric devices. This local switch can then forward messages to these network interface devices using the new static connections.

Backplane and fabric lanes in the newly installed dynamic fabric devices can be configured such that L/N fabric lanes are configured as local switch lanes, L(N−1)/N fabric lanes are configured as local interconnect lanes, L(N−1)/N backplane lanes are configured as system interconnect lanes, and L(N−1)/N backplane lanes are configured as system switch lanes.

An overall number of the system switch lanes and system interconnect lanes can increase within an increasing number of installed dynamic fabric devices. As each dynamic fabric device is connected to N−1 other devices, the total number of system interconnect lanes connected to each device is L(N−1)/N. Likewise, the total number of system switch lanes connected to each device is L(N−1)/N. Increasing the number of dynamic fabric devices therefore increases the overall number of system switch lanes and system interconnect lanes.

Example of Device Installation

As a non-limiting example, as depicted in FIG. 1G, dynamic fabric device 111a can include 32 local fabric lanes configured as local interconnect lanes. These local fabric lanes can be connected through interconnect 117a to 32 backplane lanes configured as system interconnect lanes. A first 16-lane group of the local interconnect lanes (e.g., local interconnect lane group 151a) can be communicatively connected to a first 16-lane group of the system interconnect lanes (e.g., system interconnect lane group 153a) which can be connected to system switch lanes of a first other dynamic fabric device. A second 16-lane group of the local interconnect lanes (e.g., local interconnect lane group 151b) can be communicatively connected to a second 16-lane group of the system interconnect lanes (e.g., system interconnect lane group 153b) which can be connected to system switch lanes of a second other dynamic fabric device.

Dynamic fabric device 111a can also include 16 local fabric lanes configured as local switch lanes (e.g., the lanes in local switch lane group 155a). The local switch can be configured to forward messages received from these local switch lanes to one or more of 32 backplane lanes. The backplane lanes can be configured as system switch lanes connected to system interconnect lanes of other dynamic fabric devices. A first group of 16 system switch lanes (e.g., system switch lane groups 157a) can be connected to corresponding system interconnect lanes of a first other dynamic fabric device. A second group of 16 system switch lanes (e.g., system switch lane groups 157b) can be connected to corresponding system interconnect lanes of a second other dynamic fabric device.

Dynamic fabric device 111a can be reconfigured in response to installation of another dynamic fabric devices in dynamic fabric system 100. In this non-limiting example, fabric element 115a can reconfigure a subset of the local switch lanes as local interconnect lanes. For example, interconnect 117a can be reconfigured to create connections between 4 local fabric lanes configured as local switch lanes (e.g., 4 lanes in local switch lane group 155a) and backplane lanes connected to the newly installed dynamic fabric device.

In this non-limiting example, interconnect 117a can also be reconfigured to break a subset of the static connections associating the 32 local interconnect lanes with the two other dynamic fabric devices. Interconnect 117a can be reconfigured to break the static connections between 4 local fabric lanes and backplane lanes connected to the first of the other dynamic fabric devices (e.g., 4 lanes in local interconnect lane group 151a). Interconnect 117a can also be reconfigured to break the static connections between 4 other local fabric lanes and backplane lanes connected to the second of the other dynamic fabric devices (e.g., 4 lanes in local interconnect lane group 151b). Interconnect 117a can then be reconfigured to create connections between the 8 local fabric lanes and backplane lanes connected to the newly installed dynamic fabric device.

In this non-limiting example, 12 local fabric lanes can be statically connected to backplane lanes connected in turn to the local switch of the newly installed dynamic fabric device. This local switch can detect network interface device 113a and forward messages, in accordance with destination information included in the message, to network interface device 113a. In this manner, the 12 local fabric lanes can be configured as a group of local interconnect lanes (e.g., local interconnect lane group 151c) statically connected to 12 corresponding system interconnect lanes (e.g., system interconnect lane group 153c).

In this non-limiting example, local switch 119a can continue to forward messages received from the 12 local fabric lanes still configured as local switch lanes. As the newly added device is configured, 12 local fabric lanes of that device will be statically interconnected with backplane lanes connected to local switch 119a. Local switch 119a will detect the network interface device in the newly added dynamic fabric device through these static connections. In this manner, dynamic fabric device 111a will be configured with a group of 12 system switch lanes connected to 12 corresponding system interconnect lanes of the newly added device (e.g., system switch lane group 157c).

In step 309, the control device can determine whether all devices have been configured or reconfigured. In some embodiments, the control device can base this determination on indications received from the dynamic fabric devices. In some embodiments, for example, each dynamic fabric device can determine that no further lanes remain to be configured and that the local switch and the interconnect have been configured. In some such embodiments, each dynamic fabric device can provide an indication of completed configuration to the control device. For example, the device can provide a status update or acknowledgement of correct configuration. Based on these received indications, the control device can determine that all devices have been successfully configured or reconfigured. In various embodiments, the control device can be configured to assume that devices are successfully configured or reconfigured after configuration instructions have been provided to them (e.g., the device can be assumed to be correctly configured unless it provides a contrary indication). When all devices have been configured or reconfigured, method 300 can proceed to step 311. Otherwise, method 311 can proceed to step 305 and another device can be selected.

In some embodiments, rather than iterating through dynamic fabric devices, the control device can provide configuration instructions to multiple dynamic fabric devices at once. For example, in some embodiments, the control device can broadcast configuration instructions that can be consumed by at least some of the dynamic fabric devices.

In step 311, method 300 can terminate. In some embodiments, upon termination of method 300 the dynamic fabric system can provide an indication of successful configuration or reconfiguration. In various embodiments, upon termination of successful configuration or reconfiguration, the dynamic fabric system can resume routing information from the inputs of the dynamic fabric devices to the outputs of the dynamic fabric devices.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A dynamic fabric device for implementing a Clos network switch, comprising:
    local fabric lanes;
    a network interface device being configurable to communicatively connect the local fabric lanes to a network; and
    a fabric element being configurable to implement Clos network switching at least in part by communicatively connecting the local fabric lanes to a backplane including backplane lanes, the fabric element including:
        a local switch configurable to receive messages from any of a first group of the local fabric lanes for forwarding to any of a first group of the backplane lanes; and
        an interconnect configurable to statically connect each of a second group of the local fabric lanes to a corresponding one of a second group of the backplane lanes; and
        wherein a first number of lanes in the first group of the backplane lanes equals a second number of lanes in the second group of the local fabric lanes.

2. The dynamic fabric device of claim 1, further comprising:
    a controller configurable to reconfigure the fabric element to:
        remove lanes from the first group of the local fabric lanes and add lanes to the second group of the backplane lanes in response an indication of an installation or activation of another dynamic fabric device; and
        add lanes to the first group of the local fabric lanes and remove lanes from the second group of the backplane lanes in response an indication of a failure or removal of the other dynamic fabric device.

3. The dynamic fabric device of claim 2, wherein:
    removing the lanes from the first group of the local fabric lanes comprises:
        reconfiguring a first local fabric lane to form a static connection with a first backplane lane.

4. The dynamic fabric device of claim 1, wherein:
    each static connection comprises a re-timer.

5. The dynamic fabric device of claim 1, wherein:
    the network interface device includes at least one of: a fabric interface, a traffic manager, or a packet processor; and wherein the fabric element is a cell-based self-routing fabric element.

6. The dynamic fabric device of claim 1, wherein:
    each of the local fabric lanes includes a serial transmission link and a serial reception link.

7. A dynamic fabric system for implementing a Clos network switch, comprising:
    a backplane including backplane lanes;
    at least two dynamic fabric devices configurable to implement a Clos network switch, the at least two dynamic fabric devices including a first dynamic fabric device comprising:
        local fabric lanes;
        a network interface device configurable to communicatively connect the local fabric lanes to a network;
        a local switch configurable to receive messages from any of a first group of the local fabric lanes for forwarding to any of a first group of the backplane lanes;
        an interconnect configurable to statically connect each of a second group of the local fabric lanes to a corresponding one of a second group of the backplane lanes; and
        a controller configurable to:
            remove lanes from the first group of the local fabric lanes and add lanes to the second group of the backplane lanes; and
            add lanes to the first group of the local fabric lanes and remove lanes from the second group of the backplane lanes; and
    at least one control device configured to:
        provide, to the controller in response to detecting an increase in a number of active dynamic fabric devices installed in the dynamic fabric system, instructions to remove the lanes from the first group of the local fabric lanes; or
        provide, to the controller in response to detecting a decrease in the number, instructions to add the lanes to the first group of the local fabric lanes.

8. The dynamic fabric system of claim 7, wherein:
    wherein a first number of lanes in the first group of the backplane lanes equals a second number of lanes in the second group of the local fabric lanes.

9. The dynamic fabric system of claim 7, wherein:
    the at least two dynamic fabric devices includes a second dynamic fabric device; and
    the first group of the backplane lanes connects to an interconnect of the second dynamic fabric device.

10. The dynamic fabric system of claim 7, wherein:
    each static connection comprises a re-timer.

11. The dynamic fabric system of claim 7, wherein:
    the dynamic fabric system further includes:
        a signal backplane device, the signal backplane device connected to the at least two dynamic fabric devices and configured to implement the backplane; and
        a control backplane device connected to the at least two dynamic fabric devices and the at least one control device, the control backplane device configured to enable communication between the at least one control device and each of the at least two dynamic fabric devices.

12. The dynamic fabric system of claim 7, wherein:
    the at least one control device is configured to:
        receive an automatic or manual indication of insertion or extraction of a dynamic fabric device into the dynamic fabric system; and
        provide the instructions to the controller in response to the automatic or manual indication.

13. The dynamic fabric system of claim 7, wherein:
    the at least two dynamic fabric devices includes a second dynamic fabric device;
    the first dynamic fabric device is configured to provide an automatic failure indication concerning the second dynamic fabric device to the at least one control device; and
    the at least one control device is configured to:
        receive the automatic failure indication; and
        provide the instructions to add the lanes to the first group of the local fabric lanes in response to receiving the automatic failure indication.

14. The dynamic fabric system of claim 7, wherein:
the at least two dynamic fabric devices includes a second dynamic fabric device;
the second dynamic fabric device is configured to provide an automatic failure indication concerning the second dynamic fabric device to the at least one control device; and
the at least one control device is configured to:
receive the automatic failure indication; and
provide the instructions to add the lanes to the first group of the local fabric lanes in response to receiving the automatic failure indication.

15. A method of configuring a dynamic fabric system to implement a Clos network switch, comprising:
determining a number of dynamic fabric devices installed in the dynamic fabric system;
configuring the dynamic fabric devices to implement a Clos network switch, configuration of a first dynamic fabric device comprising:
configuring a local switch to receive messages from a first group of local fabric lanes for forwarding to a first group of backplane lanes;
configuring each of a second group of the local fabric lanes to statically connect to a corresponding one of a second group of the backplane lanes; and
wherein a number of the backplane lanes in the first group of the backplane lanes equals a number of the local fabric lanes in the second group of the local fabric lanes.

16. The method of claim 15, wherein:
the second group of the backplane lanes comprises subgroups of the backplane lanes, the backplane lanes in each subgroup connected to another one of the dynamic fabric devices; and
a number of the backplane lanes in each of the subgroups equals a number of the local fabric lanes in the first group of the local fabric lanes.

17. The method of claim 16, wherein:
the configuration of the first dynamic fabric device further comprises:
detecting, by the local switch, a lane of a network interface device in another one of the dynamic fabric devices through a lane in the first group of backplane lanes.

18. The method of claim 15, wherein:
the dynamic fabric devices comprise a second dynamic fabric device; and
the configuration of the dynamic fabric devices further comprises:
providing instructions, to at least one of the first dynamic fabric device and the second dynamic fabric device, to prevent the second dynamic fabric device from forwarding messages to the first dynamic fabric device during the configuration of the first dynamic fabric device.

19. The method of claim 15, wherein:
the determination of the number of dynamic fabric devices and the configuration of the first dynamic fabric device are performed in response to:
a manual indication of insertion of a second dynamic fabric device into the dynamic fabric system or removal of the second dynamic fabric device from the dynamic fabric system; or
an automatic indication of a failure of the second dynamic fabric device.

20. The method of claim 15, wherein:
configuring a first lane of the second group of the local fabric lanes to statically connect to a corresponding first lane of the second group of the backplane lanes comprises reconfiguring a serializer/deserializer associated with the first lane as a re-timer.

* * * * *

UNITED STATES PATENT AND TRADEMARK OFFICE
CERTIFICATE OF CORRECTION

PATENT NO. : 11,245,619 B1
APPLICATION NO. : 17/111263
DATED : February 8, 2022
INVENTOR(S) : Aharon Lavon It is certified that error appears in the above-identified patent and that said Letters Patent is hereby corrected as shown below:

On the Title Page

Item (74), in the Attorney, Agent, or Firm, Line 1, "Finnegan Henderson," should read --Finnegan, Henderson,--.

Item (57), in the Abstract, Line 9, "configurable forward messages" should read --configurable to forward messages--.

In the Claims

In Claim 2, Column 23, Line 38, "in response an indication" should read --in response to an indication--.

In Claim 2, Column 23, Line 43, "in response an indication" should read --in response to an indication--.

In Claim 8, Column 24, Lines 27-28, "wherein: wherein a first number" should read --wherein: a first number--.

In Claim 9, Column 24, Line 32, "the at least two dynamic fabric devices includes" should read --the at least two dynamic fabric devices include--.

In Claim 13, Column 24, Line 57, "the at least two dynamic fabric devices includes" should read --the at least two dynamic fabric devices include--.

In Claim 14, Column 25, Line 2, "the at least two dynamic fabric devices includes" should read --the at least two dynamic fabric devices include--.

Signed and Sealed this
Fifth Day of July, 2022

*Katherine Kelly Vidal*
*Director of the United States Patent and Trademark Office*